N. W. Wheeler.
Gangway for Ferry Boat.

No. 47,479.  Patented Apr. 25, 1865.

WITNESSES:  INVENTOR:

UNITED STATES PATENT OFFICE.

NORMAN W. WHEELER, OF BROOKLYN, NEW YORK.

IMPROVED TRAMWAY FOR FERRY-BOATS.

Specification forming part of Letters Patent No. 47,479, dated April 25, 1865.

*To all whom it may concern:*

Be it known that I, NORMAN W. WHEELER, of Brooklyn, in the county of Kings and State of New York, have invented a certain new and useful improvement in ferry-boats and other vessels where vehicles are taken on and off at the same end; and I do hereby declare that the following is a full and exact description thereof.

My invention relates to certain means, which I term a "switching apparatus," whereby I am able to turn vehicles within a small space without stopping them. It is particularly useful on vessels to be used for rapid transportation and loading and unloading of guns, caissons, and baggage-wagons in an enemy's country.

The accompanying drawings form a part of this specification and represent a portion of a vessel with the switching apparatus attached.

Similar letters of reference denote corresponding parts in all the drawings.

Figure 1:
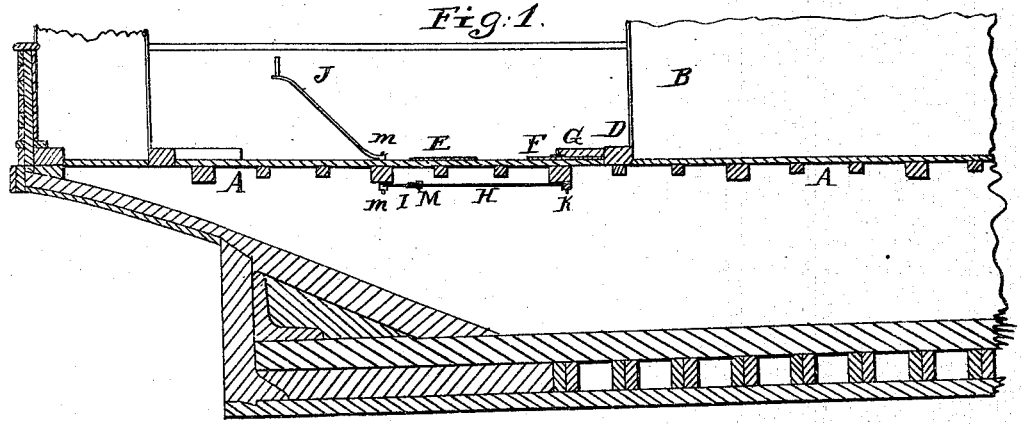
Figure 2:
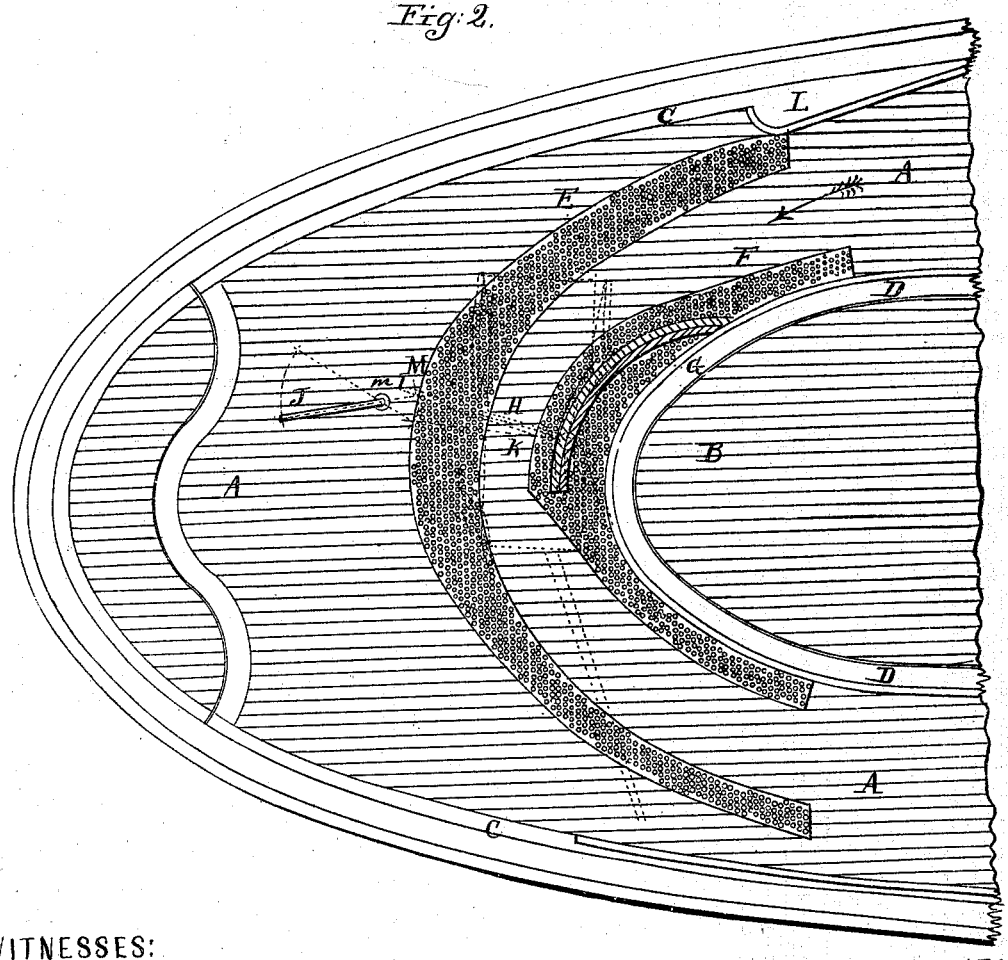

Figure 1 is a vertical section, and Fig. 2 is a plan view.

To enable others skilled in the art to make and use my invention, I will proceed to describe the construction and operation by the aid of the drawings and of the letters of reference marked thereon.

A is the deck; B, a deck-house, or it may be any space within which it is desired that the vehicles should not come; C C, the ordinary wheel-guards or coamings to prevent the wheels from striking the bulwarks, and D D similar guards to prevent the wheels from striking the deck-house and keep them within the proper track. L is a projection of the guard C to guide the wheels with certainty within reach of the switch. E and F are plates of iron, secured to the deck A, conforming to the track of the wheels to prevent the wear of the deck, which would otherwise result from a combined sliding and rolling motion of the wheels while the vehicles are being turned, as will be presently described. These plates I prefer to perforate with many holes, each hole being of less diameter than the breadth of the tires of the wheels, or they may be simply indented or raised in small figures in order that the draft-animal's shoes may take a firm hold upon them and yet allow the wheels to slide sidewise.

The turning of a vehicle is accomplished by compelling the rear wheels to describe a larger curve while being drawn around the space B than the curve described by the front wheels, which is the reverse of the ordinary action of vehicles.

To accomplish this result I place upon the plate F a curved switch-bar, G, rigidly secured to a pin, K, which pin K turns in a vertical socket, extending through to the under side of the deck and connected with the levers H, I, and J, through the pin M, so that by means of manual power applied to the lever J, when a wheel is not in contact with the switch-bar G, the latter may be readily opened to or beyond the position shown by the red dotted lines and as readily returned to its original closed position.

The fulcrum of the lever J I is denoted by *m*, and is a vertical shaft extending down through the deck A, as indicated.

To pass a vehicle around, as desired in the example before us, it will approach the switch in the direction indicated by the arrow, with its near or left side toward the space B, and will be drawn with its near front wheel in contact with the inner guard, D. The switch will at the first be opened, so as to allow the near front wheel to pass inside it, remaining in contact with the inner guard, D, in the usual manner, but as soon as the near front wheel has passed the switch-bar G, an active attendant, holding the lever J, will, by means of the system of levers J I B, close the switch to the position shown by the full black lines. The near hind wheel will next come in contact with the switch G at such an angle that it will be wedged or deflected outward with its connections, so that both the rear wheels will be deflected from their natural course and will slip laterally outward on the iron plates E F, so as to describe the larger curve of the switch itself as the vehicle is drawn forward. This action allows the end of the pole, and consequently the draft-horses and the entire carriage, to describe a smaller curve than would otherwise be practicable.

Upon the plan, Fig. 2, an army-wagon is outlined in red dotted lines, and shown in the act of turning.

The switch-bar may be operated by manual power applied directly to it, or with no other appliance than a simple pole or boat-hook, but will be the more readily and easily actuated by a system of levers, as hereinbefore described.

It will be observed that the desirable end of carrying the rear of the wagon outward might be attained by a device analogous to the transferring table used on railroads—that is to say, a small portion of the deck or supporting-surface might remain still while the fore wheels traveled across it and afterward be moved outward by suitable mechanism while the hind wheels are supported on it. So also might a turn-table, like a railroad turn-table, be used to turn the entire wagon partially around; but neither of these devices would be the complete equivalent of my invention described and represented above, because they would both require the expenditure of considerable labor by the attendant, or considerable power by a steam-engine or other motor, and, what is on some accounts more important, would consume considerable time.

My device only requires a quick and skillful man, exerting no more power than is necessary to simply swing the unloaded switch-bar G horizontally around on its center $m$.

The perforated plates E and F may be extended as long and wide as desired, and will defend the deck from wear; but they perform a peculiar and important function along the lines parallel to the switch-bar G by providing a good holding-surface for the draft-animals by their roughness, while they by the nature of the metal allow the wheels to slip sidewise more easily than a wood or any other ordinary foundation. I propose when convenient to grease these plates along the lines where the sliding is effected.

Iron pavement roughened in a similar manner has been long in use, and has proved the efficiency of such roughnesses in providing a foot-hold for animals; but I am not aware that such pavement or anything analogous to my plates E F have been proposed in connection with anything which requires a sliding of wheels or any other object upon the same, so as to render available the hardness of the metal to reduce friction.

I do not claim iron or other metal surfaces, roughened, except in combination with other parts, as described.

Having now fully described my invention, what I claim as new, and desire to secure by Letters Patent, is as follows:

1. In connection with the deck A and coaming D, the deflector or switch-bar G, so arranged and operated as to slide the rear wheels outward and cause them to describe the larger curve, substantially in the manner and for the purpose herein set forth.

2. In connection with the above, the employment of the perforated or roughened plates E F, of hard material, combined and arranged to operate in connection with the deflector G, so as to afford a hold for the animals and provide for the lateral movement or sliding of the wheels, substantially as and for the purposes herein described.

NORMAN W. WHEELER.

Witnesses:
EMIL VOSSNACK,
D. W. STETSON.